United States Patent [19]
Smith et al.

[11] Patent Number: 6,119,137
[45] Date of Patent: Sep. 12, 2000

[54] DISTRIBUTED DYNAMIC DOCUMENT CONVERSION SERVER

[75] Inventors: Jeffrey C. Smith, Menlo Park; Jean-Christophe Bandini, Cupertino, both of Calif.

[73] Assignee: Tumbleweed Communications Corp., Redwood City, Calif.

[21] Appl. No.: 08/792,171

[22] Filed: Jan. 30, 1997

[51] Int. Cl.[7] .................................................. G06F 17/21
[52] U.S. Cl. ........................... 707/523; 707/513; 709/234
[58] Field of Search .............................. 707/10, 523, 100, 707/513; 395/200.64; 709/234

[56] References Cited

U.S. PATENT DOCUMENTS

| | | | |
|---|---|---|---|
| 5,210,824 | 5/1993 | Putz et al. ................................. | 707/523 |
| 5,758,343 | 5/1998 | Vigil et al. ................................. | 707/10 |
| 5,778,372 | 7/1998 | Cordell et al. ........................... | 707/100 |
| 5,845,084 | 12/1998 | Cordell et al. ........................ | 395/200.64 |

*Primary Examiner*—James P. Trammell
*Assistant Examiner*—John Leonard Young
*Attorney, Agent, or Firm*—James D Ivey; Michael A Glenn

[57] ABSTRACT

A document delivery server dynamically customizes the format of a document to be delivered, based on the capabilities of the recipient and the type of document to be delivered. The server enables transparent delivery of formatted documents, regardless of the capabilities of the recipient. For example, the recipient platform could be a desktop computer, a network computer, a printer, a fax machine, or a personal digital assistant. The server attempts to maintain the information contained in the document in a high level representation and defers the decision of when to convert to a lower level representation, thereby maximizing the potential set of options and function at each step in the delivery process.

34 Claims, 3 Drawing Sheets

DISTRIBUTED DYNAMIC DOCUMENT CONVERSION SERVER

BACKGROUND OF THE INVENTION

1. Technical Field

The invention relates to electronic document delivery. More particularly, the invention relates to a distributed dynamic document conversion server.

2. Description of the Prior Art

One of the many complexities associated with delivering information between two disparate systems stems from basic incompatibilities between those systems including, for example, differences in capabilities. A printer has a very different set of capabilities than a personal computer, and a commensurate set of data formats which the printer might accept. A personal computer, for example, might be capable of processing a WordPerfect® document, a portable document (e.g. Adobe® Acrobat® or Novell® Envoy®), or an HTML document. A printer, by contrast, might only be capable of accepting a PCL® file or a Postscript® file. A fax machine, as with a printer, may only accept a Group 3 compressed black and white raster representation of a document. Thus, various devices have various capabilities in terms of the types of data they may accept.

Similarly, different data types offer different levels of flexibility and function. For example, an Envoy® or PDF file can be scaled to any resolution, can support millions of colors, and can include text and fonts. A Group 3 compressed fax image, on the other hand, is limited in resolution, only supports black and white colors, and includes no text or fonts, thereby limiting the ability of a recipient of a Group 3 compressed image to perform any operations, except for rudimentary operations.

The extended flexibility of a more robust data representation, such as a portable document, enables such documents to be converted to less robust representations. By illustration, a portable document might be converted to a Postscript file or even a Group 3 compressed image. One might therefore suggest that a portable document is a high level data representation and a Group 3 compressed image is a low level data representation.

In most cases, if the recipient system is capable of receiving a high level data representation, such representation is the data representation of choice due to the increased capabilities such representation provides. Thus, such representation offers a preferred common format, especially if such representation includes a mechanism that can convert the high level representation to a lower level representation as necessary.

M. Williams, R. Yun, *Method and Apparatus For Enhanced Electronic Mail Distribution,* U.S. Pat. No. 5,424,724 (Jun. 13, 1995) disclose a method and apparatus for enhanced electronic mail distribution which permits distribution of electronic mail documents to multiple host systems and/or external networks via a single host agent. A host agent reference table is established at selected host agents within a local network. Each host agent reference table includes an identification of selected destination nodes associated with an identified host agent for those nodes. A referral to the host agent reference table is used to determine the appropriate host agent for an electronic document destined for a selected node. No provision is made within this method and apparatus for dynamic data conversion. Thus, documents are delivered with its level of representation unaltered and without regard for processing capability at a destination node.

T. Schultz, A. Gross, B. Pappas, G. Shifrin, L. Mack, *Apparatus and Method of Distributing Documents To Remote Terminals With Different Formats,* U.S. Pat. No. 4,754,428 (Jun. 28, 1988) and T. Schultz, A. Gross, B. Pappas, G. Shifrin, L. Mack, *Electronic Mail,* U.S. Pat. No. 4,713,780 (Dec. 15, 1987) disclose a method and apparatus for delivering a document originated at a local site by a source having a printer output that is normally connected to a printer, to one or more remote locations having printers or display devices that may differ from the printer normally connected to the printer output of the document generating source. Printer command signals which are normally provided at the printer output are converted to character and position data which represent the respective characters and their horizontal and vertical positions on each page of the document. The character and position data are transmitted to a remote location and reconverted to a form for driving a printer or other display device to produce a line-for-line conforming copy of the original.

The '428 and '780 patents disclose the use of upstream data conversion, but do not provide downstream data conversion. That is, the '428 and '780 patents disclose a method and apparatus that allows text to be sent to a printer and converted to a printer specific format. However, such method and apparatus lacks the ability to start with a high-level representation of the data, and only convert to a lower level representation if such conversion is determined to be necessary. Thus, such approach is not satisfactory where printer format is not known or established prior to document origination, or where a heterogeneous network, such as the Internet, is used to deliver data.

L. Harkins, K. Hayward, T. Herceg, J. Levine, D. Parsons, *Network Having Selectively Accessible Recipient Prioritized Communication Channel Profiles,* U.S. Pat. No. 5,513,126 (Apr. 30, 1996) discloses a method for a sender to automatically distribute information to a receiver on a network using devices and communications channels defined in a receiver profile. The receiver profile establishes the properties and mode for receipt of information for receivers on the network and the profile is published in a network repository for all network users or is accessible for selected groups or individuals on the network. The disclosed network does not provide for data conversion, but rather involves sending predetermined data based on the capabilities of the recipient which are communicated through channels. Thus, each recipient must first establish a format before data are exchanged.

M. Bloomfield, *Sender-Based Facsimile Store and Forward Facility,* U.S. Pat. No. 5,404,231 (Apr. 4, 1995) discloses a system that provides sender-based store and forward services for delivering facsimile based information. The system is solely concerned with the delivery of facsimile bitmap images, and not with data conversion.

In view of the limitations attendant with the state of the art, it would be advantageous to provide a system in which the ability to descend to a lower level representation is preserved to allow the flexibility to do so at a future point in time, but that also enables a richer set of functions as appropriate.

SUMMARY OF THE INVENTION

The invention provides a document delivery server which dynamically customizes the format of a document to be delivered, based on the capabilities of the recipient and the type of document to be delivered. The server thereby enables the transparent delivery of formatted documents, regardless of the capabilities of the recipient. For example, the recipient platform could be a desktop computer, a network computer, a printer, a fax machine, or a personal digital assistant. The server attempts to maintain the information contained in the document in a high level representation and defers the decision of when to convert to a lower level representation, thereby maximizing the potential set of options and function at each step in the delivery process. Accordingly, the invention starts with a high-level representation of data, and only converts to a lower level representation if necessary.

DETAILED DESCRIPTION OF THE INVENTION

The invention provides a technique that defers the decision to descend to a lower level representation, thereby preserving the flexibility to do so at a future point in time, while also enabling a richer set of functions. The dynamic document conversion server, or DDCS, herein disclosed exploits this concept.

Figure 1:
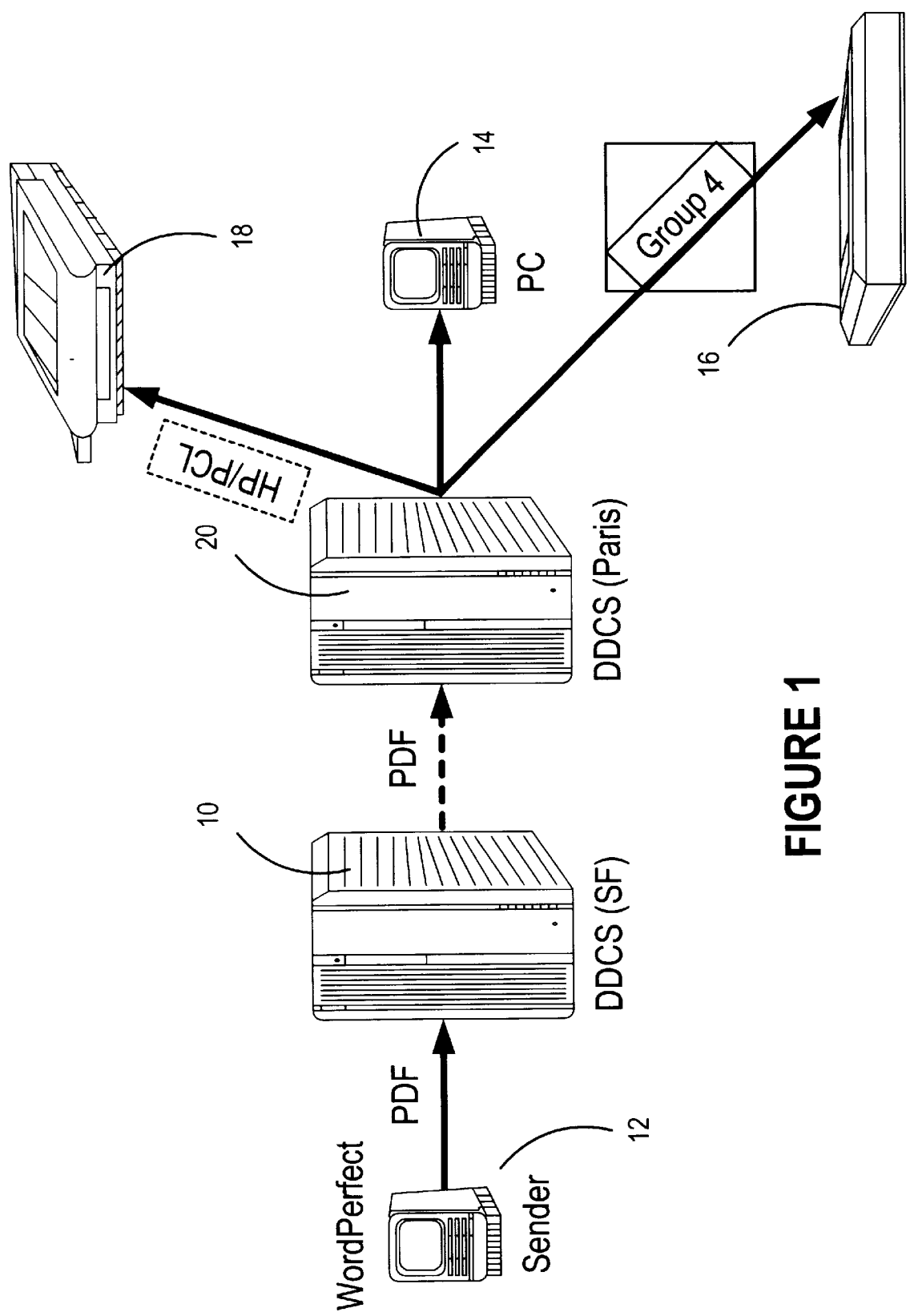
FIG. 1 is a block schematic diagram that shows an example of an application involving a dynamic document conversion server according to the invention.

FIG. 1 is a block schematic diagram that shows an example of an application involving a dynamic document conversion server according to the invention. To illustrate and document the architecture of the DDCS, consider an example. Suppose a sender 12 of a WordPerfect® document wants to distribute a formatted document to a recipient. Suppose the sender does not know what capabilities the recipient may or may not possess, including whether the recipient is a desktop computer 14, a facsimile machine 16, or printer 18. In such case, the sender could opt to convert the document to a low level representation and then send that representation. However, if the recipient possesses a computer capable of receiving a higher level representation, then the recipient may lose such features of the document as color, scalability, or content. Hence, the premature conversion of a document to a lower level representation limits the flexibility and function for the recipient.

If the sender sends, for example, a portable document representation of the WordPerfect® document, thus preserving the document in a high level representation, without offering the capabilities of the DDCS for converting the document and the recipient turns out to be a printer, then the delivery fails.

Neither example above offers an optimal solution—i.e. distributing the best data representation to the recipient, where best is defined as the highest level representation based on the initial format of the data, as well as the capabilities of the recipient.

The DDCS disclosed herein achieves optimal results in this instance. The sender 12 of the document sends data to the recipient via the DDCS server 10, thus introducing a level of indirection between send and receive. The data are delivered from the sender to the DDCS server in a high level representation. The DDCS server may propagate the data, bringing the data closer to the intended recipient. At each step, the DDCS can dynamically convert the data from a high level representation to a lower level representation, based on the data to be delivered and the next server or recipient's capabilities. Ultimately, a terminal DDCS server 20 delivers the document to the recipient, making a final data conversion if necessary.

Suppose in the above example of a WordPerfect® document, the sender 12 runs a Macintosh® computer with WordPerfect®, and the receiver is a fax machine 16. In this case, the sender transfers a high level representation of the WordPerfect® document to the initial DDCS server 10. The conversion of the document from WordPerfect® to a portable, high level representation, such as PDF, is transparent to the user. Such conversion may be performed by either the sender or by the initial DDCS in any known manner, for example with regard to the PDF format, as is readily offered by Adobe® Acrobat®. The initial DDCS server accepts the PDF document, and then initiates a transfer to the recipient, based upon standard network protocols.

In this case, assume that the sender is located in San Francisco, while the recipient fax machine is in Paris. The DDCS server forwards the PDF document to another DDCS server 20 in Paris. This second DDCS server then attempts to forward the document to the recipient. At the point of delivery, the second DDCS server learns, via database lookup or interactive dialog with the recipient, that the recipient is in fact a fax machine. The Paris DDCS server then discovers what capabilities the fax machine possesses. In this example, the fax machine supports Group 4 compressed images. The Paris DDCS server then dynamically converts the PDF document to a Group 4 compressed image using known techniques. In this case, Group 4 compressed, black and white, 200 by 100 dots per inch is determined to be the best representation.

Suppose, by contrast, that the Paris DDCS server 20 instead discovers that the recipient is a Hewlett-Packard® Color Deskjet® printer 18. In this case, the Paris DDCS server converts the document from PDF to the lower level HP Printer Control Language using conventional techniques. Unlike the previous case, the best representation in this case is color, 360 by 300 dots per inch.

Suppose, once more for contrast, the Paris DDCS server 20 discovers the recipient has a personal computer 14 running the DOS operating system. In this case, the Paris DDCS server sends a textual representation of the document to the recipient.

If the Paris DDCS server discovers that the recipient has a personal computer running the Microsoft® Window® operating system, with the Acrobat application installed (a program capable of reading a PDF file), the server forwards the PDF representation of the document.

Figure 2:
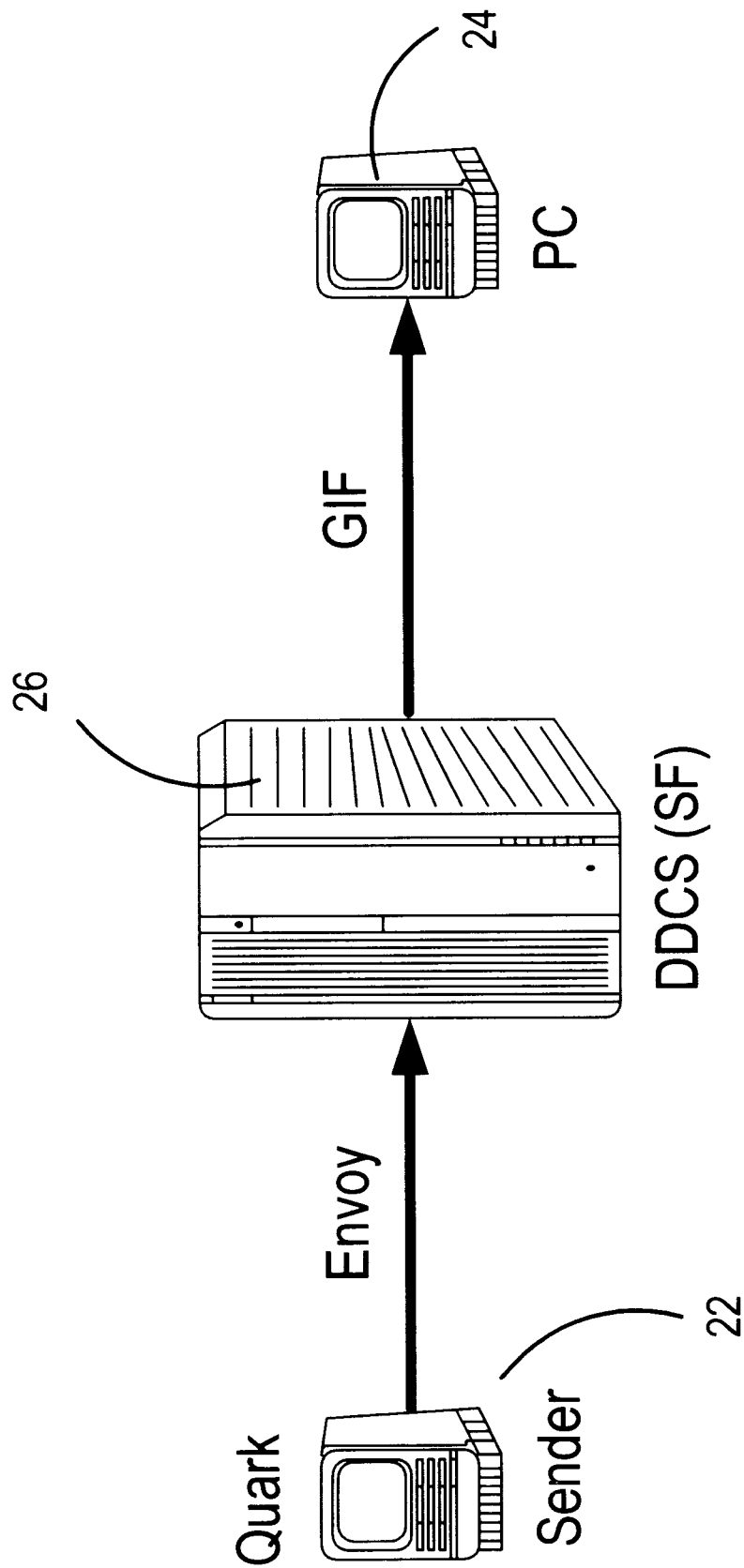
FIG. 2 is a block schematic diagram that shows another example of an application involving the dynamic document conversion server according to the invention.

FIG. 2 is a block schematic diagram that shows another example of an application involving the dynamic document conversion server according to the invention. In this case, the sender 22 wants to send a Quark® Xpress® document. The same process as discussed above applies here, whereby the document is transparently converted to a high level representation, in this case Envoy®, and delivered to the initial DDCS server 26. The DDCS server then delivers the document directly to the intended recipient 24, and does not forward the document to another server. The DDCS server, upon initiating delivery to the recipient, discovers that the recipient does not possess an Envoy® application capable of reading the document format, but that instead the recipient is a Web browser capable of reading a GIF® bitmap representation of the document. In this case, the DDCS server dynamically converts the high level Envoy® representation to the lower level GIF® representation, and then delivers the GIF® to the recipient.

Figure 3:
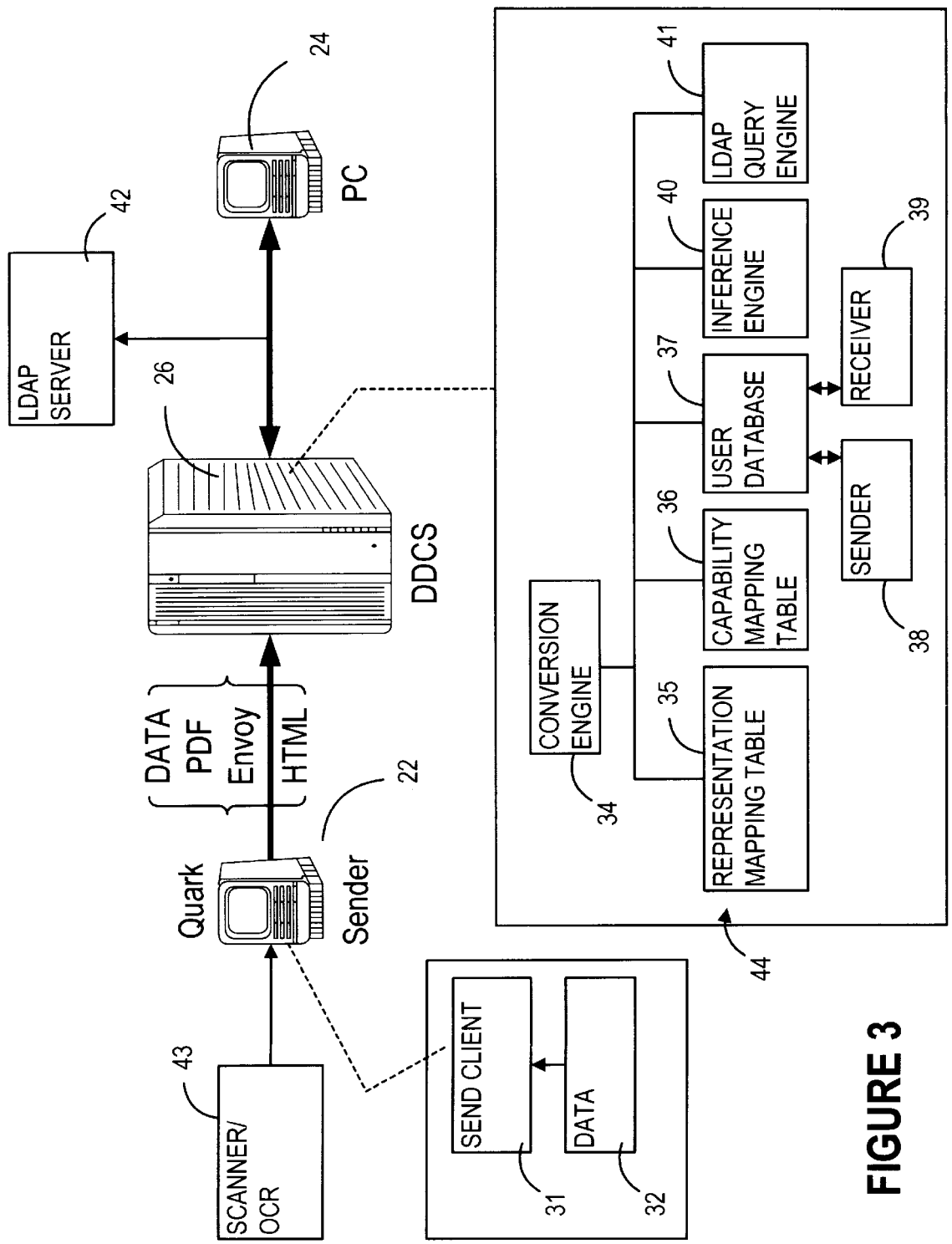
FIG. 3 is a block schematic diagram showing a presently preferred implementation of the dynamic data conversion server according to the invention.

FIG. 3 is a block schematic diagram showing a presently preferred implementation of the dynamic data conversion server according to the invention. The preferred implementation of the DDCS follows directly from the above discussion regarding the design.

In this embodiment of the invention, the sender 22 has a Send Client 31 running on his machine. The invention architecture presumes that the data 32, e.g. the document, are in a high level representation, and therefore the data are created on a computer of some form. Note that in the case where the data may start in a low level representation, for example paper, the architecture is still applicable if the sender's computer can convert the representation to a high level representation, for example using optical character recognition technology 43.

The Send Client 31 typically performs an initial conversion of any data to a more malleable, yet high level, representation because proprietary high level formats often are not intended for distribution and conversion, but rather for editing purposes. As such, DDCS servers are more optimal for distributable data representations, including portable documents and SGML derivatives, such as HTML. In one preferred embodiment of the invention the Send Client therefore converts data from a high level, proprietary representation to a high level, portable representation. Arguably, such a conversion represents the first instance when the data conversion drops some of the information and becomes less high level. Typically, the sender uses filtering technology or virtual printer drivers for this purpose. Note that the invention does not require any conversion at the sender (client) level and other embodiments of the invention may defer conversion until the data are delivered to the DDCS server. Accordingly, one novel feature of the invention is derived from deferring the decision of when to convert data to a lower level representation, thus preserving maximum flexibility.

The high level representation in whatever form is then transmitted, for example via HTTP, from the sender's computer to a DDCS server 26. The server then proceeds to deliver the document to the intended recipient 24. The specific delivery mechanism employed can include, for example email, email notification with HTTP delivery (see J. Smith, J.-C. Bandini, *Electronic Document Delivery System*, U.S. patent application Ser. no. 08/738,966 filed Oct. 24, 1996), direct TCP/IP communication, or fax.

When the server initiates delivery, the server uses a DDCS facility 44 to determine whether to convert the data to be delivered to a lower level representation. The server maintains a series of mapping tables 35, 36 to facilitate potential mapping between representations. An exemplary table 35 includes the possible mapping from a given data representation.

Table 1 provides an example of possible mapping from a given data representation:

TABLE 1

Mapping From A Given Data Representation

| Source Data Representation | Possible Mapping |
| --- | --- |
| WordPerfect ® Document | Envoy ®, PDF, HTML |
| Excel Document | Envoy ®, PDF, HTML |
| Envoy ® Document | PDF, PCL ®, Postscript ®, Text, JPEG, GIF, Group 4, Group 3 |
| PDF Document | Envoy ®, PCL ®, Postscript ®, Text, JPEG, GIF ®, Group 4, Group 3 |
| JPEG Image | GIF ®, Group 4, Group 3 |
| GIF ® Image | Group 4, Group 3 |
| Group 4 Image | Group 3 |

Another mapping table 36 which the server maintains is the table containing the possible data representations given a specific capability.

Table 2 provides an example of possible data representations given a specific capability:

TABLE 2

Data Representations Given A Specific Capability

| Target Device (Recipient) | Capabilities | Possible Mapping |
| --- | --- | --- |
| Personal Computer | Microsoft ® Window ®/Netscape 2.0 | Envoy ®, PDF, HTML, JPEG, GIF ®, Text |
| Personal Computer | Microsoft ® Window ®/Netscape ® 1.1 | HTML, GIF ®, Text |
| Workstation | Unix/Netscape ® | PDF, HTML, JPEG, GIF ® Text |
| Personal Computer | Windows | Text |
| Printer | Postscript ® II | Postscript ® I, Postscript ® II |
| Printer | Postscript ® I | Postscript ® I |
| Printer | PCL ® 5 | PCL ® 5, PCL 4, PCL 3 |
| Printer | PCL ® 3 | PCL ® 3 |
| Fax Machine | Group 4 image | Group 4, Group 3 |
| Fax Machine | Group 3 image | Group 3 |

Given the above tables which describe possible mapping, the server then must determine the appropriate format for the data to be delivered, as well as the recipient capabilities. Several techniques are employed.

The primary technique for deriving the information regarding the data format to be delivered entails maintaining a data base 37 of capabilities with the server of specific users which have used the server, either to pick up information 39, or to send information 38.

For example, if a sender of information delivered an Microsoft® Word document to the server to send the document to a specific recipient, the server now knows that the sender can receive Microsoft® Word documents, or similarly, an Envoy® or PDF document. The server retains such information in this capability data base 37. When users pick up documents from the server, for example in instances where the delivery mechanism used email notification and HTTP delivery, the HTTP protocol describes recipient capabilities regarding platform and Internet web browser type and version. Such information can be used at this point, but can also be recorded in the capabilities data base for future reference of deliveries that do not involve HTTP delivery, for example.

The server can also use an inference engine 40 to infer recipient capabilities, based on the type of delivery mechanism and the address used to describe the recipient. For example, a telephone number address implies the recipient uses a fax machine. The server can query the fax machine and determine whether the fax machine supports Group 4 or Group 3, for example, and can then update the format accordingly.

The server can also use an LDAP query engine 41 to query recipient capabilities dynamically using the Internet Lightweight Directory Access Protocol (LDAP) standard developed by the University of Michigan in conjunction with the Internet Engineering Task Force. LDAP servers 42 provide directory and other services. The DDCS server queries LDAP servers in real time for capabilities information pertinent to a particular delivery.

Once the data format has been determined, and the recipient capabilities have been identified, the server then uses the mapping tables to conclude whether data conversion is required or appropriate. This determination, in many instances, requires more than mapping table look-ups. For example, multiple mapping are often required to discover the best data representation. Such conversions are performed by a conversion engine 34.

The actual data conversion process goes beyond the scope of this invention, and moreover has been widely available in the computer software industry. For example, it has been known how to convert a PDF document to a Postscript® document from the time that Adobe Systems shipped the first version of Acrobat®. If an Acrobat viewer is running on a DDCS server, that viewer is instructed to print a document to a particular type of printer if necessary. So, in general, the actual data conversion itself is not directly relevant for this invention, but is rather a matter of choice.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A method for dynamically delivering electronic documents via an electronic network, comprising the steps of:

receiving, in a dynamic document conversion server through said electronic network, a high level representation of an electronic document for delivery to a recipient;

determining a destination data format for said document based upon said recipient's capability to process said document in said destination data format;

converting said document to said destination data format to form a converted document; and completing delivery of said converted document to said recipient through said electronic network.

2. The method of claim 1, wherein receiving comprises:

receiving said document in a portable document data format.

3. The method of claim 1, wherein said document is delivered from a sender to said server in a high level representation.

4. The method of claim 1, wherein said server propagates said document via said electronic network to a second server interposed between said dynamic document conversion server and said recipient, thereby bringing said document closer to said recipient.

5. The method of claim 4, further comprising the step of:

converting said document from a native data format to a delivery data format, based on the native data format and capabilities of an immediate destination to process said document in said delivery data format.

6. The method of claim 5 wherein said immediate destination is the second server.

7. The method of claim 5 wherein the delivery data format is different from the destination data format.

8. The method of claim 1, further comprising the step of:

performing a database lookup to identify said recipient's capability to process said document in said destination data format.

9. The method of claim 1, further comprising the step of:

using a server facility to determine whether to convert said document to the destination data format.

10. The method of claim 9, further comprising the step of:

maintaining a series of mapping tables to facilitate potential mapping between data formats.

11. The method of claim 10, further comprising the step of:

providing a table that includes possible mapping from a given data format.

12. The method of claim 10, further comprising the step of:

providing a table that includes possible data data formats given a specific capability.

13. The method of claim 1, further comprising the step of:

maintaining a data base of capabilities with said server of specific users which have used said server.

14. The method of claim 1, further comprising the step of:

providing an inference engine to infer recipient capabilities.

15. The method of claim 14, wherein said inference is based on one or more selected from a group consisting of a type of delivery mechanism and an address used to describe said recipient.

16. The method of claim 1, further comprising the step of:

providing an LDAP query engine to query recipient capabilities dynamically using a Lightweight Directory Access Protocol.

17. The method of claim 1, further comprising the step of:

performing an interactive dialog with said recipient to identify said recipient's capability to process said document in said destination data format.

18. An apparatus for delivering electronic documents via an electronic network comprising a sender for sending a high level representation of an electronic document to a recipient, said apparatus comprising:

a dynamic document conversion server for forwarding said document to said recipient, said server comprising:

a facility for determining a destination data format for said document based upon said recipient's capability to process said document in said destination data format; and a conversion engine for converting said document to said destination data format to form a converted document.

19. The apparatus of claim 18, wherein said sender comprises:

a send client for converting said document to a portable document representation of said document before sending said document.

20. The apparatus of claim 18, wherein said document is delivered from a sender to said server in a high level representation.

21. The apparatus of claim 18, wherein said server propagates said document via said electronic network to a second server interposed between the first-mentioned server and said recipient, thereby bringing said document closer to said recipient.

22. The apparatus of claim 21, further comprising:

a conversion engine for converting said document from a native data format to a delivery data format, based on the native data format and capabilities of an immediate destination to process said document in said delivery data format.

23. The apparatus of claim 22, wherein the immediate destination is the second server.

24. The apparatus of claim 22, wherein the delivery data format is different from the destination data format.

25. The apparatus of claim 18, further comprising:

an inference engine for performing a database lookup to identify said recipient's capability to process said converted document.

26. The apparatus of claim 18, further comprising:

a server facility for determining whether to convert said document to be delivered to the destination data format.

27. The apparatus of claim 26, further comprising:

at least one series of mapping table for facilitating potential mapping between data formats.

28. The apparatus of claim 27, further comprising:

a table that includes possible mapping from a given data format.

29. The apparatus of claim 27, further comprising:

a table that includes possible data formats given a specific capability.

30. The apparatus of claim 18, further comprising:

a data base of capabilities of specific users which have used said server.

31. The apparatus of claim 18, further comprising:

an inference engine to infer recipient capabilities.

32. The apparatus of claim 31, wherein said inference is based on one or more selected from a group consisting of a type of delivery mechanism and an address used to describe said recipient.

33. The apparatus of claim 18, further comprising:

an LDAP query engine to query recipient capabilities dynamically using a Lightweight Directory Access Protocol.

34. The apparatus of claim 18, further comprising:

an inference engine for performing an interactive dialog with said recipient to identify said recipient's capability to process said converted document.

* * * * *